US009192016B1

(12) United States Patent
Athalye et al.

(10) Patent No.: US 9,192,016 B1
(45) Date of Patent: Nov. 17, 2015

(54) LIGHTING APPARATUS WITH INDUCTOR CURRENT LIMITING FOR NOISE REDUCTION

(71) Applicant: Cree, Inc., Durham, NC (US)

(72) Inventors: Praneet Jayant Athalye, Morrisville, NC (US); Michael McIntyre, Chapel Hill, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/284,643

(22) Filed: May 22, 2014

(51) Int. Cl.
*H01J 1/52* (2006.01)
*H05B 33/08* (2006.01)

(52) U.S. Cl.
CPC ................... *H05B 33/0887* (2013.01)

(58) Field of Classification Search
CPC ................... H05B 37/02; H02J 7/125
USPC .............................. 315/85, 283, 297
See application file for complete search history.

(56) References Cited

U.S. PATENT DOCUMENTS

| | | | |
|---|---|---|---|
| 5,803,579 A | 9/1998 | Turnbull et al. | |
| 5,941,626 A | 8/1999 | Yamuro | |
| 7,088,059 B2 | 8/2006 | McKinney et al. | |
| 7,994,725 B2 | 8/2011 | Bouchard | |
| 2002/0097095 A1 | 7/2002 | Jeon et al. | |
| 2004/0046510 A1 | 3/2004 | Allen | |
| 2004/0245554 A1 | 12/2004 | Oh et al. | |
| 2005/0243630 A1 | 11/2005 | Hsu et al. | |
| 2007/0108843 A1 | 5/2007 | Preston et al. | |
| 2010/0060175 A1 | 3/2010 | Lethellier | |
| 2010/0231133 A1 | 9/2010 | Lys | |
| 2010/0308738 A1 | 12/2010 | Shteynberg et al. | |
| 2010/0308739 A1 | 12/2010 | Shteynberg et al. | |
| 2011/0025217 A1* | 2/2011 | Zhan et al. | 315/219 |
| 2011/0068701 A1 | 3/2011 | van de Ven et al. | |
| 2011/0273102 A1 | 11/2011 | van de Ven et al. | |
| 2012/0026761 A1* | 2/2012 | Young | 363/44 |
| 2012/0091920 A1 | 4/2012 | Yang | |
| 2012/0099321 A1 | 4/2012 | Scott et al. | |
| 2012/0126714 A1 | 5/2012 | Deppe et al. | |
| 2013/0069535 A1 | 3/2013 | Athalye | |
| 2013/0069536 A1 | 3/2013 | Ni | |
| 2013/0187572 A1 | 7/2013 | Grajcar | |
| 2014/0084801 A1* | 3/2014 | Lys | 315/201 |

OTHER PUBLICATIONS

Mitter, C.S., "Active Inrush Current Limiting Using MOSFETs," Motorola, Inc., Motorola Semiconductor Application Note, AN 1542, 1995, 14 pages.

* cited by examiner

*Primary Examiner* — Don Le
(74) *Attorney, Agent, or Firm* — Myers Bigel Sibley & Sajovec, P.A.

(57) ABSTRACT

A lighting apparatus includes a lighting circuit (e.g., an LED lighting circuit) and a driver circuit having an output coupled to the lighting circuit and an input configured to be coupled to a power source, such as a phase cut dimmer, that provides a varying voltage waveform. The driver circuit includes an electromagnetic interference (EMI) suppression inductor configured to be coupled in series with the power source and a bypass circuit configured to divert current from the EMI filter inductor to limit a current in the EMI filter inductor.

29 Claims, 5 Drawing Sheets

LIGHTING APPARATUS WITH INDUCTOR CURRENT LIMITING FOR NOISE REDUCTION

BACKGROUND

The present inventive subject matter relates to lighting apparatus and methods and, more particularly, to solid-state lighting apparatus.

Solid-state lighting arrays are used for a number of lighting applications. A solid-state light-emitting device may include, for example, a packaged light emitting device including one or more light emitting diodes (LEDs). These may include inorganic LEDs, which may include semiconductor layers forming p-n junctions, and/or organic LEDs (OLEDs), which may include organic light emission layers.

Solid-state lighting devices are commonly used in lighting fixtures, including task lighting, recessed light fixtures, ceiling mounted troffers and the like. Solid-state lighting panels are also commonly used as backlights for small liquid crystal display (LCD) screens, such as LCD display screens used in portable electronic devices, and for larger displays, such as LCD television displays.

Solid-state lighting devices may be attractive for retrofit/replacement applications, where devices such as LEDs may offer improved energy efficiency, reduced heat generation, extended life and desired performance characteristics, such as certain color and/or color rendering capabilities. For example, LED bulbs are commonly used to replace incandescent bulbs in down lights and other applications to reduce energy consumption and increase time between replacements. LED-based replacements for fluorescent lamps have also been developed.

Solid-state lighting devices often include power switching circuitry that may generate electromagnetic interference (EMI). Accordingly, solid-state lighting devices typically include EMI filters to reduce the amount of noise introduced on power line by such circuitry.

SUMMARY

Some embodiments of the inventive subject matter provide a lighting apparatus including a lighting circuit (e.g., an LED lighting circuit) and a driver circuit having an output coupled to the lighting circuit and an input configured to be coupled to a power source, such as a phase cut dimmer, that provides a varying voltage waveform. The driver circuit includes an electromagnetic interference (EMI) suppression inductor configured to be coupled in series with the power source and a bypass circuit configured to divert current from the EMI filter inductor to limit a current in the EMI filter inductor.

In some embodiments, the bypass circuit is configured to divert current responsive to an edge of the varying voltage waveform. The edge may be, for example, a leading edge of a phase cut AC waveform. The bypass circuit may be configured to limit a magnitude of a voltage across the EMI filter inductor to a value less than a saturation threshold of the EMI inductor and greater than a maximum magnitude of the voltage across the EMI filter inductor when the power source is applying a non-phase cut AC waveform to the input of the driver circuit. The bypass circuit may be configured to limit the current in the EMI filter inductor responsive to a voltage across the EMI filter inductor.

In some embodiments, the bypass circuit may include a diode. For example, the bypass circuit may include a transient voltage suppressor (TVS) coupled in parallel with the EMI filter inductor. The TVS may be configured to clamp a magnitude of a voltage across the EMI filter inductor to a value less than a saturation threshold of the EMI filter inductor. In further embodiments, the bypass circuit may include a series combination of a TVS and a resistor coupled in parallel with the EMI filter inductor.

Some embodiments of the inventive subject matter provide a lighting apparatus including a lighting circuit and a driver circuit having an output coupled to the lighting circuit and an input configured to be coupled to a dimmer. The driver circuit includes an inductor, such as an EMI filter inductor, coupled to the input. The driver circuit further includes an inductor current limiter circuit configured to limit a current in the inductor responsive to a leading edge of a phase cut voltage applied to the input. The inductor current limiter circuit may include a bypass circuit configured to divert current from the inductor responsive to the leading edge. The bypass circuit may be configured, for example, to limit the current through the inductor responsive to a voltage across the inductor.

In some embodiments, the bypass circuit may be coupled across the inductor. For example, the bypass circuit may include a transient voltage suppressor (TVS) coupled in parallel with the inductor. In further embodiments, the bypass circuit may include a series combination of a TVS and a resistor coupled in parallel with the inductor.

Still further embodiments of the inventive subject matter provide a driver circuit for a lighting apparatus, such as an LED lighting apparatus. The driver circuit includes an inductor configured to be coupled to an AC power source, a capacitor coupled to the power source via the inductor and a bypass circuit configured to divert current away from the inductor responsive to an edge of a phase cut voltage produced by the AC power source.

The bypass circuit may be coupled across the inductor. For example, the bypass circuit may include at least one diode, for example, a TVS, coupled across the inductor. In some embodiments, the bypass circuit may include a series combination of a TVS and a resistor.

The inductor may include an EMI filter inductor, and the bypass circuit may be configured to limit a magnitude of a voltage across the EMI filter inductor to a value less than a saturation threshold of the EMI inductor and greater than a maximum magnitude of the voltage across the EMI filter inductor when the AC power source produces a non-phase cut AC voltage.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
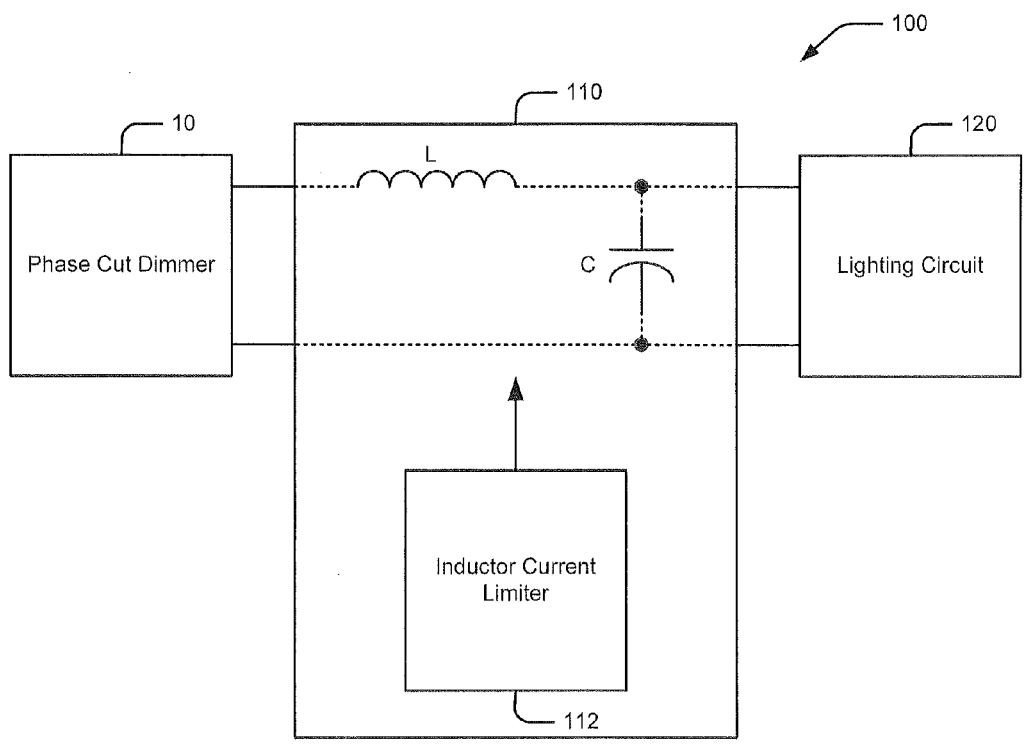
FIG. 1 is a schematic diagram illustrating lighting apparatus with an inductor current limiter according to some embodiments.

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. When a third element "couples" first and second elements, additional intervening elements may be present between the third element and the respective first and second elements. It will be further understood that elements "coupled in series" or "serially connected" may be directly coupled or may be coupled via intervening elements.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

Some embodiments of the inventive subject matter arise from a realization that momentary high currents associated with driving a solid-state lighting device may result in saturation of EMI filter inductors and resultant magnetostriction that causes audible noise. For example, when such a device is driven from a leading-edge phase cut dimmer, large inrush currents due to charging of capacitors may occur when the dimmer turns on at a relatively high voltage magnitude. These large inrush currents may saturate an EMI inductor of the device and cause mechanical deformation thereof due to magnetostriction. This may result in generation of a vibration at twice the AC input frequency, which may cause unpleasant audible noise. While such noise may be reduced using mechanical techniques, some embodiments of the inventive subject matter may reduce such noise by momentarily limiting current through the EMI inductor to reduce or prevent saturation and magnetostriction.

FIG. 1 illustrates a lighting apparatus 100 according to some embodiments. The apparatus 100 includes a driver circuit 110 configured to be coupled to an AC source, such as a phase cut dimmer 10. A lighting circuit 120 is driven by the driver circuit 110. It will be appreciated that the lighting circuit 120 may include, for example, one or more light-emitting diodes (LEDs).

The driver circuit 110 may include any of a number of different types of analog and/or digital circuitry, such as switching circuitry configured to selectively provide current to the lighting circuit 120. As illustrated, the circuitry of the driver circuit 110 includes at least one capacitor C configured to be charged by the phase cut dimmer 10 via at least one inductor L, which may be, for example, a component of an EMI filter. Coupling between the at least one inductor L and the capacitor C may be direct or may occur through intervening circuitry. As further shown, the driver circuit 110 further includes an inductor current limiter circuit 112 configured to limit a current in the inductor L under certain conditions such that, for example, magnetostriction in the inductor L and attendant vibration and noise is reduced or eliminated.

Figure 2:
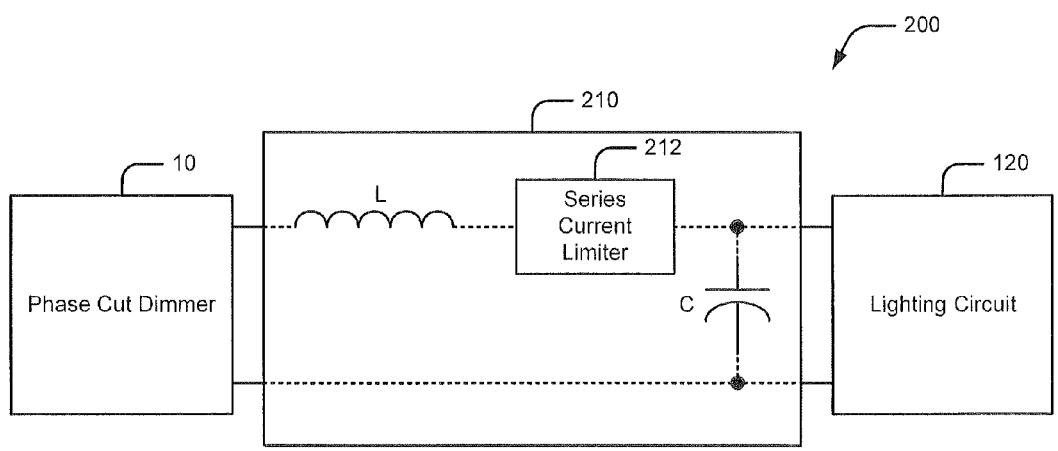
FIG. 2 is a schematic diagram illustrating lighting apparatus with a series current limiter according to some embodiments.

As illustrated in FIG. 2, in a lighting apparatus 200 including a driver circuit 210 including an inductor L and capacitor C along the lines described above, an inductor current limiter may include a current limiter 212 coupled in series with the inductor L. The series current limiter 212 may include, for example, a depletion-mode MOSFET current limiter that provides increased impedance with increased current. While such a series limiter may prevent or reduce vibration and noise, it may undesirably dissipate power and otherwise negatively affect performance of the lighting apparatus.

Figure 3:
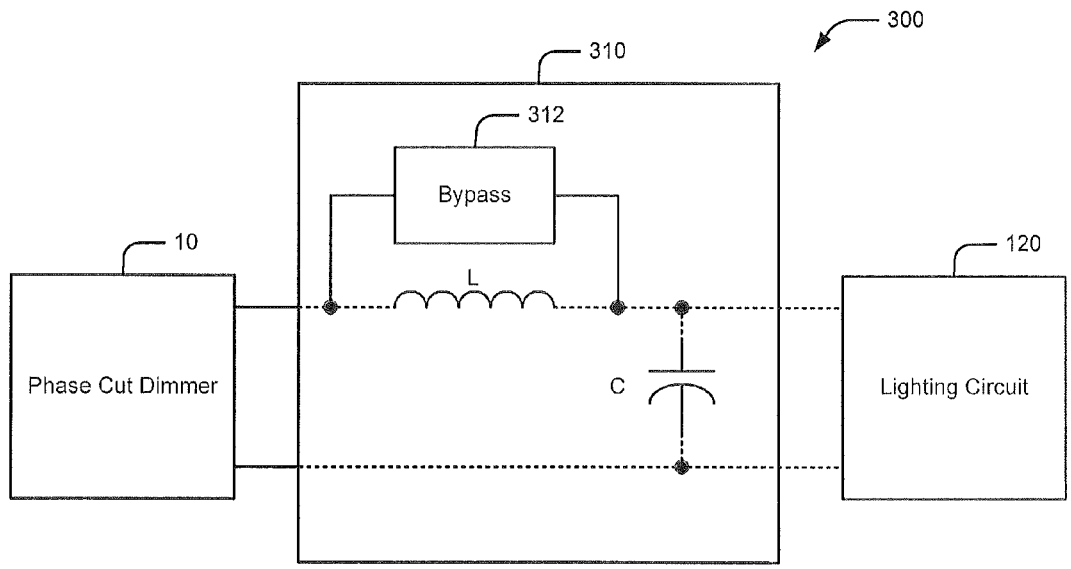
FIG. 3 is a schematic diagram illustrating lighting apparatus with an inductor bypass according to some embodiments.

According to further embodiments, noise-inducing current in an inductor may be limited by using current diversion circuitry that momentarily diverts current away from the inductor under certain input voltage conditions without significantly reducing the EMI filtering capability of the inductor. For example, as illustrated in FIG. 3, a lighting apparatus 300 may include a driver circuit 310 with a bypass circuit 312 configured to selectively bypass current around the inductor L under certain conditions that may lead to an undesirable level of magnetostriction in the inductor L. For example, the bypass circuit 312 may be configured to bypass the inductor L when the capacitor C coupled thereto has a relatively low voltage and the phase cut dimmer 10 is producing a relatively high voltage (e.g., when turning on at a relatively high voltage level of the AC input to the dimmer 10), a condition under which a large amount of current might flow through the inductor L in the absence of the bypass circuit 312. The bypass circuit 312 may be further configured to block or attenuate the bypass current responsive to this voltage differential being at a level that will acceptably limit magnetostriction in the inductor L, e.g., when the capacitor C is sufficiently charged and/or when the phase cut dimmer 10 is introducing little or no phase cut.

It will be appreciated that such conditions may be detected in any of a number of different ways, e.g., by monitoring voltage at the capacitor C, at the inductor L or elsewhere in the driver circuit 310. It will also be appreciated that, in some embodiments, such a bypass circuit 312 may operate responsive to a current sensor configured to sense current through the inductor L or elsewhere. It will be further appreciated that the bypass circuit 312 need not completely prevent magnetostriction. For example, the bypass circuit 312 may be configured to reduce magnetostriction to level such that, for example, additional mechanical noise-reducing measures in the lighting apparatus and/or associated structures maintain an acceptable level of audible noise.

Figure 4:
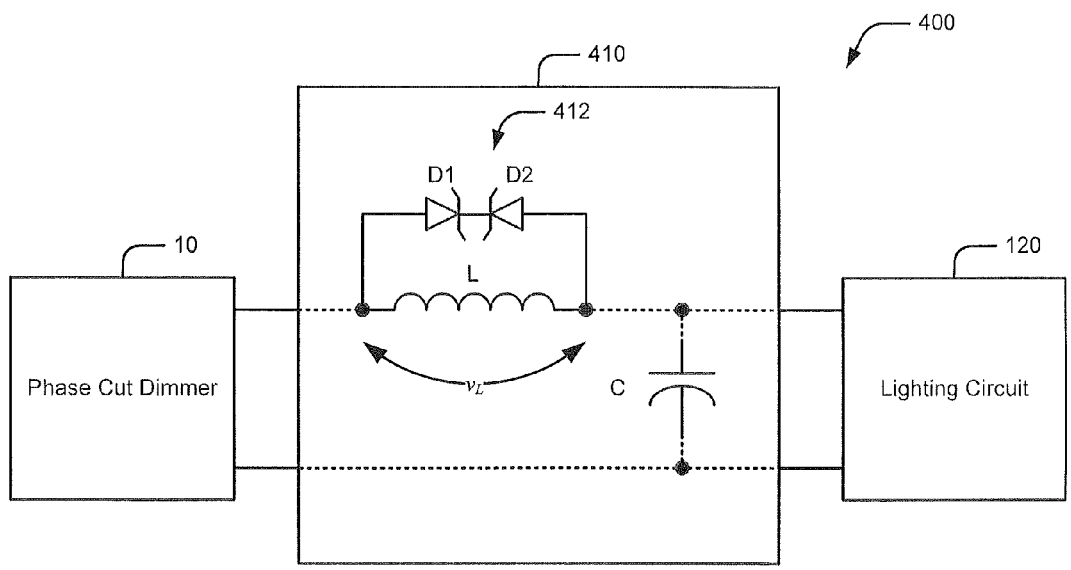
FIG. 4 is a schematic diagram illustrating lighting apparatus with transient voltage suppressor (TVS) inductor bypass according to some embodiments.

FIG. 4 illustrates an example of such a bypass circuit. Referring to FIG. 4, a driver circuit 410 includes a transient voltage suppressor (TVS) 412 coupled across the inductor L. The TVS 412, which is schematically illustrated as two serially-connected diodes D1, D2 but may be an integrated device, is configured to conduct current when that magnitude of a voltage $v_L$ across the inductor L exceeds a certain level, thus limiting current passing through the inductor L until the magnitude of the voltage $v_L$ falls below that level. It will be noted that the TVS 412 is bidirectional, i.e., it is capable of conduction during both positive and negative cycles of the voltage produced by the phase-cut dimmer 10. It will be appreciated that other circuitry, such as other diode circuits, varistors, gas discharge tubes and/or various other combinations of active and/or passive components, may be used in a similar manner.

Figure 5:
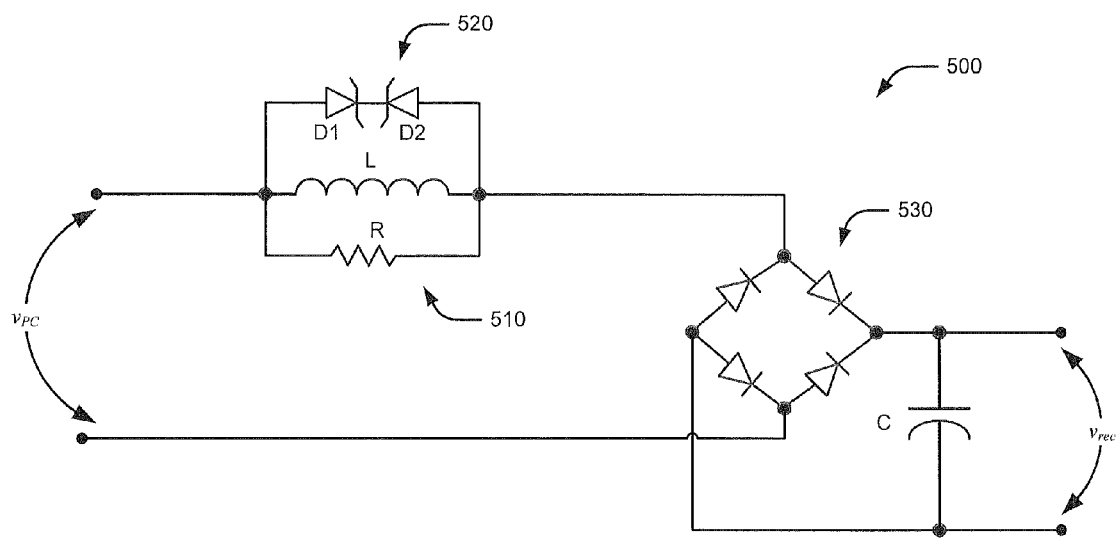
FIG. 5 is a schematic diagram illustrating a driver with a TVS inductor bypass according to some embodiments.

FIG. 5 illustrates a driver circuit 500 for a lighting apparatus according to some embodiments incorporating such a bypass circuit. The driver circuit 500 is configured to receive an AC voltage $v_{AC}$ from a phase cut dimmer and includes an EMI filter 510 including an inductor L and a resistor R. The EMI filter 510 couples the phase cut dimmer to a full-wave diode bridge rectifier 530 that generates a rectified voltage $v_{rec}$. A capacitor C is coupled across the output port of the rectifier 530. As further shown, a bypass circuit 520 for the EMI filter inductor L includes a TVS, illustrated as comprising diodes D1, D2. The bypass circuit 520 is configured to selectively bypass the inductor L when inrush current to the capacitor C through the inductor L is sufficient to cause undesirable magnetostriction in the inductor L. In some embodiments, the bypass circuit 520 may be configured to clamp a magnitude of the voltage $v_l$ across the inductor L to a value that is greater than a maximum value the magnitude of the voltage $v_l$ reaches when the phase cut dimmer applies substantially no phase cut (i.e., the input is an uncut sinusoid), but less than a magnitude associated with an undesirably high current in the inductor L, such as a saturation threshold for the inductor L. For example, in some embodiments, the bypass circuit 520 may clamp the magnitude of the voltage $v_l$ to a value in a range from about 3 volts to about 5 volts, which may provide for a significant reduction in vibration generated by magnetostriction of the inductor L without unduly negatively affecting EMI filtering. It will be appreciated, however, that an optimal clamp voltage may generally depend on the characteristics of the inductor L. For example, an inductor with a greater saturation threshold may be clamped at a higher voltage. In addition, as noted above, the clamp voltage may represent a tradeoff with respect to other noise-reducing measures, such as potting or padding.

Figure 6:
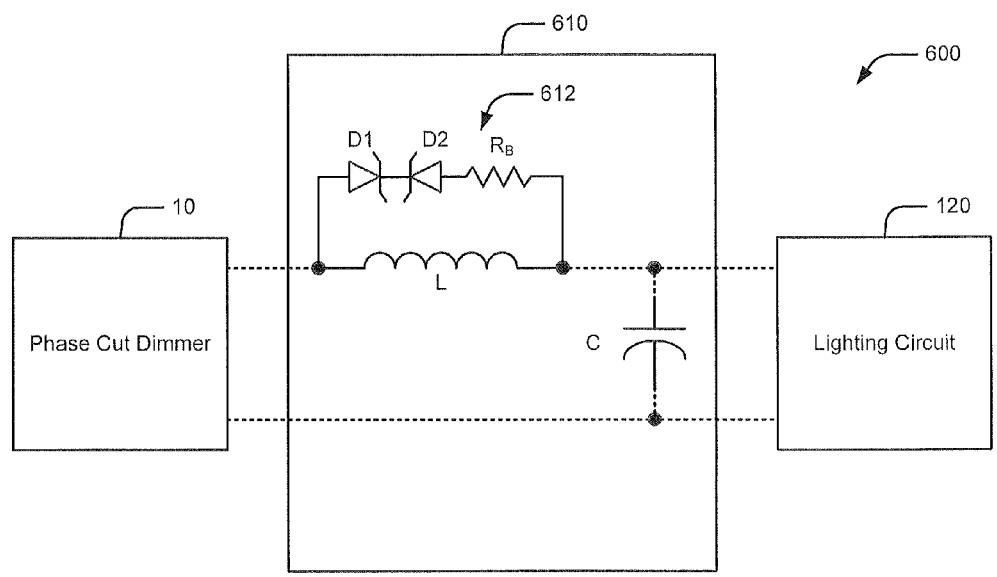
FIG. 6 is a schematic diagram illustrating lighting apparatus with a TVS bypass according to further embodiments.
Figure 7:
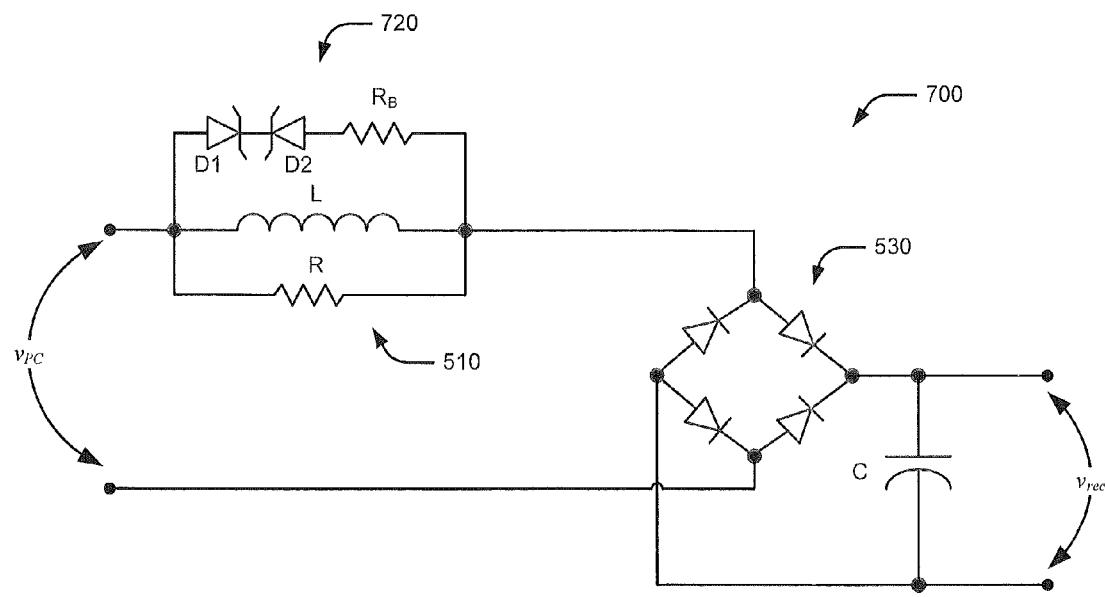
FIG. 7 is a schematic diagram illustrating a driver with a TVS inductor bypass according to further embodiments.

According to further embodiments, additional components may be added to such a bypass circuit to provide damping or other features. Referring to FIG. 6, a driver circuit 610 may include a bypass circuit 612 including a TVS D1, D2 coupled in series with a resistor $R_B$. The resistor R may provide reduce peak currents and damp high-frequency ringing. FIG. 700 illustrates application of such a bypass circuit in a driver circuit 700. The driver circuit 700 includes an EMI filter 510 and rectifier 530 along the lines of FIG. 5, with a bypass circuit 720 including a TVS D1, D2 coupled in series with a resistor $R_B$.

Figure 8:
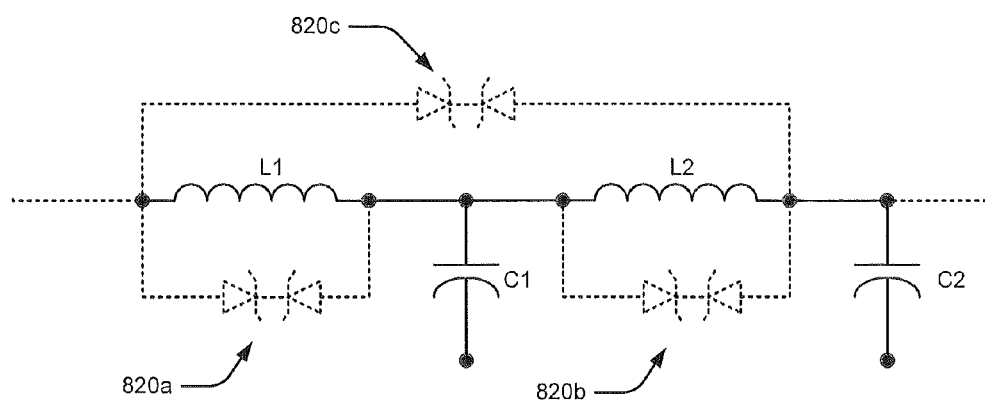
FIG. 8 is a schematic diagram illustrating various applications of bypass circuitry to an EMI filter according to some embodiments.

Some embodiments of the inventive subject matter may be used with other EMI filter arrangements. For example, referring to FIG. 8, a multistage EMI filter 810 may include first and second series-connected inductors L1, L2 and parallel-connected capacitors C1, C2. A bypass circuit 820a, 820b, 820c may be connected in parallel with one or more of the inductors L1, L2 and/or across the serial combination of the inductors L1, L2.

Figure 9:
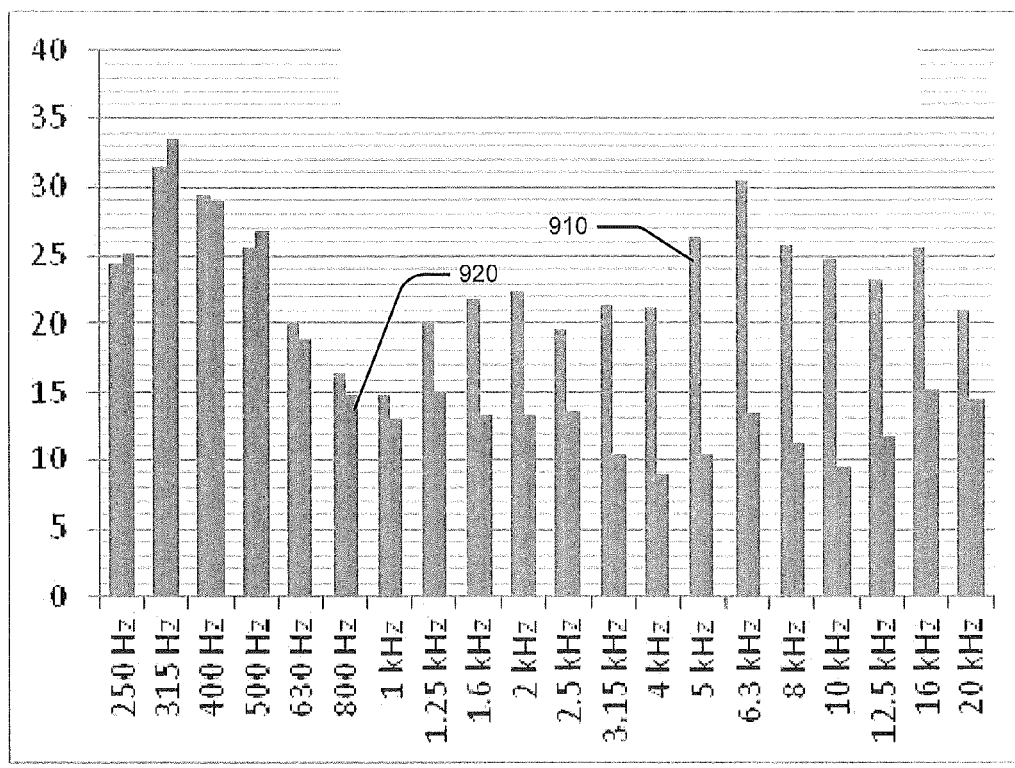
FIG. 9 is graph illustrating noise level performance of a lighting apparatus according to some embodiments.

FIG. 9 illustrates a noise level 910 produced by an LED lighting apparatus with a TVS-type EMI inductor bypass as illustrated in FIG. 5 in comparison to a noise level 920 of a similar apparatus without the EMI inductor bypass. As shown, a significant reduction in noise can be achieved using circuitry that is relatively low in cost in comparison to other techniques, such as silicone potting of the driver circuitry and/or supporting or mechanically isolating the driver circuitry with foam, rubber or similar vibration-damping materials.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. A lighting apparatus comprising:
a lighting circuit; and
a driver circuit having an output coupled to the lighting circuit and an input configured to be coupled to a power source that provides a varying voltage waveform, the driver circuit comprising an electromagnetic interference (EMI) filter inductor configured to be coupled in series with the power source and a bypass circuit configured to conduct a bypass current to thereby divert current from the EMI filter inductor for a first state of a voltage across the EMI filter inductor to limit a current in the EMI filter inductor and to terminate conduction of the bypass current for a second state of the voltage across the EMI filter inductor.

2. The lighting apparatus of claim 1, wherein the bypass circuit is configured to divert current responsive to an edge of the varying voltage waveform.

3. The lighting apparatus of claim 1, wherein the edge comprises a leading edge of a phase cut AC waveform.

4. The lighting apparatus of claim 3, wherein the bypass circuit is configured to limit a magnitude of the voltage across the EMI filter inductor to a value less than a saturation threshold of the EMI inductor and greater than a maximum magnitude of the voltage across the EMI filter inductor when the power source is applying a non-phase cut AC waveform to the input of the driver circuit.

5. The lighting apparatus of claim 1, wherein the bypass circuit is configured to limit the current in the EMI filter inductor responsive to the voltage across the EMI filter inductor.

6. The lighting apparatus of claim 1, wherein the bypass circuit comprises a diode.

7. The lighting apparatus of claim 1, wherein the bypass circuit is coupled in parallel with the EMI filter inductor.

8. The lighting apparatus of claim 7, wherein the bypass circuit comprises a TVS coupled in parallel with the EMI filter inductor.

9. The lighting apparatus of claim 1, wherein the lighting circuit comprises an LED lighting circuit.

10. The lighting apparatus of claim 1, wherein the power source comprises a phase cut dimmer.

11. A lighting apparatus comprising:
a lighting circuit; and
a driver circuit having an output coupled to the lighting circuit and an input configured to be coupled to a power source that provides a varying voltage waveform, the driver circuit comprising an electromagnetic interference (EMI) filter inductor configured to be coupled in series with the power source and a bypass circuit configured to divert current from the EMI filter inductor to limit a current in the EMI filter inductor, wherein the bypass circuit comprises a transient voltage suppressor (TVS) coupled in parallel with the EMI filter inductor.

12. The lighting apparatus of claim 11, wherein the TVS is configured to clamp a magnitude of a voltage across the EMI filter inductor to a value less than a saturation threshold of the EMI filter inductor.

13. A lighting apparatus comprising:
a lighting circuit; and
a driver circuit having an output coupled to the lighting circuit and an input configured to be coupled to a power source that provides a varying voltage waveform, the driver circuit comprising an electromagnetic interference (EMI) filter inductor configured to be coupled in series with the power source and a bypass circuit configured to divert current from the EMI filter inductor to limit a current in the EMI filter inductor, wherein the bypass circuit comprises a series combination of a TVS and a resistor coupled in parallel with the EMI filter inductor.

14. A lighting apparatus comprising:
a lighting circuit; and
a driver circuit having an output coupled to the lighting circuit and an input configured to be coupled to a dimmer, the driver circuit comprising an inductor coupled to the input and an inductor current limiter circuit configured to initiate a diversion of current from the EMI filter inductor and thereby limit a current in the inductor responsive to a leading edge of a phase cut voltage applied to the input.

15. The lighting apparatus of claim 14, wherein the inductor current limiter circuit comprises a bypass circuit configured to divert current from the inductor responsive to the leading edge.

16. The lighting apparatus of claim 15, wherein the bypass circuit is configured to limit the current through the inductor responsive to a voltage across the inductor.

17. The lighting apparatus of claim 15, wherein the bypass circuit is coupled across the inductor.

18. The lighting apparatus of claim 15, wherein the bypass circuit comprises a transient voltage suppressor (TVS) coupled in parallel with the inductor.

19. The lighting apparatus of claim 15, wherein the bypass circuit comprises a series combination of a TVS and a resistor coupled in parallel with the inductor.

20. The lighting circuit of claim 14, wherein the inductor comprises an EMI filter inductor.

21. The lighting apparatus of claim 14, wherein the inductor current limiter circuit is configured to terminate the diversion of current within a cycle of the phase cut voltage following the leading edge.

22. A driver circuit for a lighting apparatus, the driver circuit comprising:
an inductor configured to be coupled to an AC power source;
a capacitor coupled to the power source via the inductor; and
a bypass circuit configured to divert current away from the inductor responsive to an edge of a phase cut voltage produced by the AC power source.

23. The driver circuit of claim 22, wherein the bypass circuit is coupled across the inductor.

24. The driver circuit of claim 23, wherein the bypass circuit comprises at least one diode coupled across the inductor.

25. The driver circuit of claim 24, wherein the at least one diode comprises a TVS.

26. The driver circuit of claim 24, wherein the bypass circuit comprises a series combination of a TVS and a resistor.

27. The driver circuit of claim 22, wherein the inductor comprises an EMI filter inductor.

28. The driver circuit of claim 27, wherein the bypass circuit is configured to limit a magnitude of a voltage across the EMI filter inductor to a value less than a saturation threshold of the EMI inductor and greater than a maximum magnitude of the voltage across the EMI filter inductor when the AC power source produces a non-phase cut AC voltage.

29. The driver circuit of claim 22, wherein the edge comprises a leading edge.

* * * * *